US009619522B2

(12) United States Patent
Bastide et al.

(10) Patent No.: US 9,619,522 B2
(45) Date of Patent: Apr. 11, 2017

(54) PROVIDING SOCIAL NETWORK FEEDBACK

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 14/220,554

(22) Filed: Mar. 20, 2014

(65) Prior Publication Data

US 2015/0269155 A1  Sep. 24, 2015

(51) Int. Cl.
*G06F 17/30*  (2006.01)
*H04L 12/58*  (2006.01)

(52) U.S. Cl.
CPC .......... *G06F 17/3053* (2013.01); *H04L 51/26* (2013.01); *H04L 51/32* (2013.01)

(58) Field of Classification Search
CPC ......... H04L 51/10; H04L 51/04; H04L 51/36; H04L 51/26; H04L 51/32; H04L 12/58; G06Q 10/107; G06F 17/3053; Y10S 707/913; Y10S 707/917
See application file for complete search history.

(56) References Cited

U.S. PATENT DOCUMENTS

| 7,664,821 B1 | 2/2010 | Ancin et al. |
| 8,401,009 B1 * | 3/2013 | Dorsey ................. H04L 51/066 370/389 |
| 8,682,723 B2 | 3/2014 | Parsons et al. |
| 9,143,468 B1 * | 9/2015 | Cohen ..................... H04L 51/00 |
| 2007/0271336 A1 | 11/2007 | Ramaswamy |
| 2011/0307403 A1 | 12/2011 | Rostampour et al. |
| 2012/0143972 A1 | 6/2012 | Malik et al. |
| 2012/0148034 A1 | 6/2012 | Ferguson |
| 2012/0158630 A1 | 6/2012 | Zaman et al. |
| 2012/0166532 A1 | 6/2012 | Juan et al. |

OTHER PUBLICATIONS

Liangjie Hong, Ovidiu Dan, Brian D. Davison, "Predicting Popular Messages in Twitter", Department of Computer Science and Engineering, Lehigh University, WWW 2011, Mar. 28-Apr. 1, 2011, ACM, citeseerx.ist.psu.edu/viewdoc/download, pp. 1 and 2.*
IBM, "SPSS Statistics", provided in post disclosure by Colleen Bulman on Dec. 9, 2013, printed on Dec. 9, 2013, <http://www-01.ibm.com/software/analytics/spss/products/statistics/>.

(Continued)

*Primary Examiner* — Cheryl Lewis
(74) *Attorney, Agent, or Firm* — Isaac J. Gooshaw

(57) ABSTRACT

Feedback enhancement tool in a social network is provided. A processor receives a new message. The processor determines a popularity score of the new message based, at least in part, on a likelihood the new message will be viewed by one or more recipients of the new message. The processor generates a visual indicator based, at least in part, on the popularity score prior to the user posting the new message to the social network for viewing by the one or more recipients.

20 Claims, 5 Drawing Sheets

(56) References Cited

OTHER PUBLICATIONS

IBM, "SPSS Text Analytics for Surveys", provided in post disclosure by Colleen Bulman on Dec. 9, 2013, printed on Dec. 9, 2013, <http://www-01.ibm.com/software/analytics/spss/products/statistics/text-analytics-for-surveys/>.

Cano et al., "Capturing Entity-Based Semantics Emerging from Personal Awareness Streams," 1st Workshop on Making Sense of Microposts, downloaded from <http://ceur-ws.org/Vol-718/paper_08.pdf>, 2001, pp. 33-44.

International Business Machines Corporation, "Gaining full value from survey text," 2010, IBM Software Business Analytics, 12 pages.

International Business Machines Corporation, "SPSS Statistics," downloaded from <http://www-01.ibm.com/software/analytics/spss/products/statistics/> on Aug. 19, 2014, 2 pages.

International Business Machines Corporation, "SPSS text Analytics for Surveys," downloaded from <http://www-03.ibm.com/software/products/en/spss-text-analytics-surveys> on Aug. 19, 2014, 2 pages.

Wikipedia, "Natural Language Processing," downloaded from <http://en.wikipedia.org/wiki/Natural_language_processing> on Aug. 19, 2014, 11 pages.

Sanebox; "Your Email Without SaneBox," Downloaded from the Internet on Jul. 2, 2015, pp. 1-10, <http://www.sanebox.com/how-it-works#sthash.hEqocKRM.SmV6aodi.dpbs>.

SaneBox; "Email Overload in the Enterprise: The science behind email productivity," Sanebox.com, No Publication date, pp. 1-8.

U.S. Appl. No. 14/601,874, entitled "Graph Segment Representing a Gist of an Online Social Network Conversation", filed Jan. 21, 2015.

U.S. Appl. No. 15/069,587, entitled "Graph Segment Representing a Gist of an Online Social Network Conversation", filed Mar. 14, 2016.

IBM Appendix P, list of IBM patents or patent applications treated as related, pp. 1-2, dated Aug. 25, 2016.

\* cited by examiner

PROVIDING SOCIAL NETWORK FEEDBACK

TECHNICAL FIELD OF INVENTION

The present invention relates generally to the field of social networking, and more particularly to enhancing feedback for users of social networks.

BACKGROUND

A social network comprises numerous users who create relationships with one another in order to share content. The users typically have similar interests with each other that serve as the catalyst for collaborating with similar users that are part of the social network. The similar interests serve as a basis for users to form relationships or contact within the social network. Users collaborate with other users having similar interests by creating and joining groups to deliver content to likeminded individuals. Once relationships are established within the social network, users share content by way of messages, either as text or media rich formats such as audio or video. As more users join the social network, the amount of content on the social network increases, and as a result, the visibility of a new message is lessened when shared with other users.

SUMMARY

In an aspect of the invention, a method for providing feedback in a social network is provided. The method receives a new message. The method determines a popularity score of the new message based, at least in part, on a likelihood the new message will be viewed by one or more recipients of the new message. The method generates a visual indicator based, at least in part, on the popularity score prior to the user posting the new message to the social network for viewing by the one or more recipients.

In another aspect of the invention, a computer program product is provided with the computer program product comprising one or more computer readable storage mediums and program instructions stored on the one or more computer readable storage mediums. Program instructions are provided to receive a new message. Program instructions are provided to determine a popularity score of the new message based, at least in part, on a likelihood the new message will be viewed by one or more recipients of the new message. Program instructions are provided to generate a visual indicator based, at least in part, on the popularity score prior to the user posting the new message to the social network for viewing by the one or more recipients.

In yet another aspect of the invention, a system is provided comprising one or more processors, computer readable storage mediums communicatively coupled to the one or more processors, and program instructions stored on the one or more computer readable storage mediums. Program instructions are provided to receive a new message. Program instructions are provided to determine a popularity score of the new message based, at least in part, on a likelihood the new message will be viewed by one or more recipients of the new message. Program instructions are provided to generate a visual indicator based, at least in part, on the popularity score prior to the user posting the new message to the social network for viewing by the one or more recipients.

In yet another aspect of the invention, a method for deploying a system for providing feedback in a social network comprises providing a computer infrastructure being operable to: receive a new message; determine a popularity score of the new message based, at least in part, on a likelihood the new message will be viewed by one or more recipients of the new message, and generate a visual indicator based, at least in part, on the popularity score prior to the user posting the new message to the social network for viewing by the one or more recipients.

DETAILED DESCRIPTION

Figure 1:
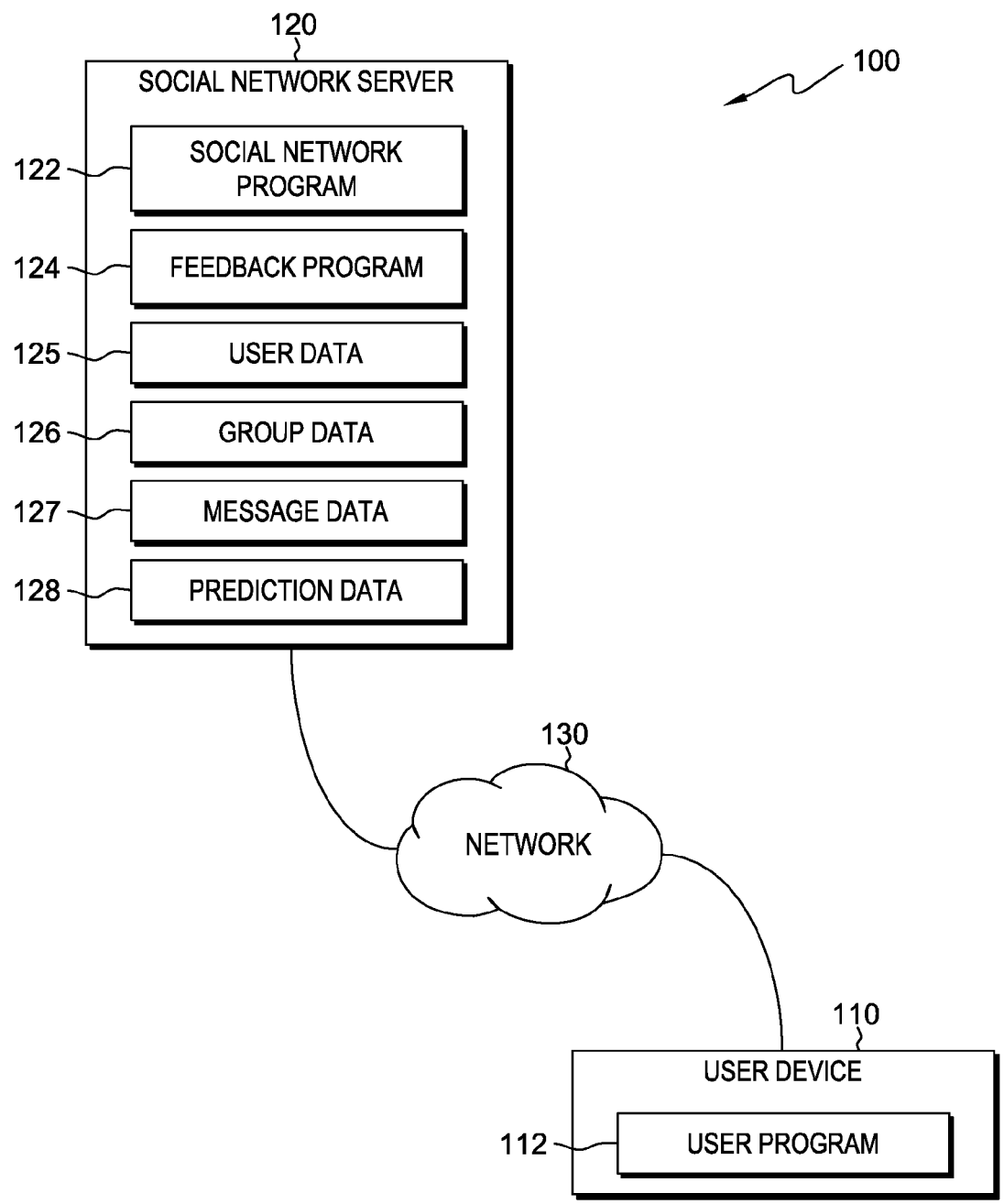
FIG. 1 is a functional block diagram illustrating a networked environment, in accordance with an embodiment of the present invention.

In order for a user's message to be heard by other users of a social network, the message will need to be tailored to meet the interests of other users. Embodiments of the present invention disclose providing to a user a visual indication as to how popular a message will be when posted to the social network and also offer suggestions to increase the message's visibility. Also, as more messages and content are being posted at a given time by users, a need has arisen to provide quick and simple feedback that indicates if the messages the users create will be viewed by other users. The present invention provides feedback by way of suggesting changes to messages, including the content contained within the messages, as well as generating a visual indicator representing the predicted popularity for the messages users create.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating social network environment, generally designated 100, in accordance with one embodiment of the present invention. Networked environment 100 includes user device 110, and social network server 120 that are connected via network 130. User device 110 includes user program 112. Server 120 respectively includes social network program 122, feedback program 124, user data 125, group data 126, message data 127, and prediction data 128.

In various embodiments of the present disclosure, user device 110 and social network server 120 are computing devices that can each respectively be a standalone device, server, laptop computer, tablet computer, netbook computer, personal computer (PC), or desktop computer. In another embodiment, user device 110 and social network server 120 each represent a computing system utilizing clustered computers and components to act as a single pool of seamless resources. In general, user device 110 can be any computing device or a combination of devices with access to, and capable of executing, user program 112, and that is capable of requesting, receiving and passing information to and from social network server 120. Social network server 120 can also be any computing device or a combination of devices with access to user data 125, group data 126, message data 127, and prediction data 128. Social network server 120 can also be any computing device or a combination of devices with access to, and is capable of executing, user program 112, social network program 122, and feedback program 124. User device 110 and social network server 120 may include internal and external hardware components, as depicted and described in further detail with respect to FIG. 5.

In one embodiment, user program 112 is stored on user device 110, while social network program 122, feedback program 124, user data 125, group data 126, message data 127, and prediction data 128 are stored on social network server 120. However, in other embodiments, user program 112, social network program 122, feedback program 124, user data 125, group data 126, message data 127, and prediction data 128 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110, social network server 120, social network program 122, feedback program 124, user data 125, group data 126, message data 127, and prediction data 128 in accordance with an embodiment of the present invention.

User program 112 operates to provide access to social network program 122 to a user and also send message information and receive feedback from feedback program 124. In one embodiment, user program 112 of user device 110 receives input from a user to create a new message to post on social network program 122. User program 112 sends the new message to feedback program 124. Feedback program 124 determines a popularity score for the new message and provides feedback to the user program 112 by a visual indicator which represents the popularity score. User program 112 displays the visual indicator to give the user an indication as to how popular the new message is determined to be when posted to social network program 122. Given that the popularity score is below a certain value, feedback program 124 generates suggestions to improve the popularity score of the new message and send the suggestions to user program 112. User program 112 displays the suggestions to the user. User program 112 receives changes to the new message from the user, which may include the suggestions. When user program 112 receives any changes made to the new message by the user, user program 112 sends the altered new message to feedback program 124. Feedback program 124 determines the popularity score of the altered new message. Feedback program 124 updates the popularity score in response to a change in the new message. Feedback program 124 generates a new visual indicator representative of the current popularity score. Feedback program 124 sends the new visual indicator to user program 112. Feedback program 124 monitors for changes in the new message as received by user program 112 from a user. In response to determining that a change has occurred, feedback program 124 determines a new popularity score, Feedback program 124 continues monitoring the new message input received from user program 112, until user program 112 receives input from the user to post the new message to the social network program 122.

In one embodiment, user program 112 is a web browser capable of communicating with both social network program 122 and feedback program 124 by way of hypertext transfer protocol or HTTP. In other embodiments, user program 112 may be a dedicated application capable of communicating with both social network program 122 and feedback program 124 by way of application programming interfaces of APIs. One skilled in the art will recognize that any application can be used for user program 112, as well as any supporting protocols or interfaces, in order to communicate with both social network program 122 and feedback program 124.

User program 112 receives requests from a user to display information stored on social network server 120. Such information may include user data 125, group data 126, and message data 127. In response to receiving the request user program 112 sends a query of the requested information to social network program 122. Social network program 122 sends the requested information to user program 112, which in turns displays the requested information to the user on user device 110.

Social network program 122 creates profiles for a user when the user signs up for access to social network program 122. Each user's profile is stored in user data 125. User data 125 contains profiles for each user of the social network program 122 as well as credentials to grant access to the profile associated with each user. Social network program 122 grants access to users of user program 112 based upon received credentials, e.g. a username and password, sent by user program 112. Social network program 122 compares the received credentials with user data 125 associated with the provided credentials to authenticate the user. In response to a successful authentication, the user is permitted access to functions of social network program 122 such as, but not limited to, creating messages, viewing messages created by others, and joining groups.

User data 125, stores profiles of users, which contain information describing a particular user's personal information, friends or contacts of the user, as well as any groups the user is a member of. Personal information stored within a user profile may include the user's name, a nickname or alias, location, work experience, hobbies, interests and any other information that describes the user's lifestyle. Each user profile stored in user data 125 includes entries for other users' profiles to be friends or contacts for a particular user. Friends or contacts are added to user data 125 when user program 112 receives a request from the user to add another user to his profile as a friend or contact. User program 112 sends the request to social network program 122, which in turn adds the friend or contact to the users profile and stores the new friend of contact in user data 125.

Each user profile that is stored in user data 125 also stores information regarding which groups a user is a member of. Users are able to create groups that other users can join. Groups allow likeminded users, or users with similar qualities, to share messages with members of the group. A user enters a request to user program 112 to create a group. The group may be public, where any user of social network program can become a member of the group, or private, granting membership by sending an invite to join the group. When creating a group, a user enters a request to user program 112 to make the user a member of a group. User program 112 sends the request to social network program 122, which, in turn, creates the group and stores the group's information in group data 126.

Group data 126 contains entries for each group of the social network. For each entry a list of members is stored in group data 126 as well as a profile of the group. The profile for a group contains information describing the group, e.g. a name for the group, the group's interests or purpose, links to information regarding the group. The profile of a group can associate one or more users as administrators of the group. A user designated as administrator can edit the profile of the group and, given the group is private, can send invites to add members to the group.

Profiles stored in user data 125 may be public or private to allow other users of social network program 122 to view the information stored in the profile of user data 125 for a particular user. A public profile is viewable by any user of social network program 122. A private profile is only viewable by friends or contacts of the user, as stored in user data 125. In some embodiments, users are able to choose what parts of a profile are public and which are private. In other embodiments, users are able to select information stored in the profile to not be viewable by anyone, regardless if the other user is a friend, contact, or both are members of the same group.

In one embodiment, social network program 122 of social network server 120 allows users of a social network to share messages and content between each other or among groups that are part of the social network. Social network program 122 coordinates the sending and receiving of shared messages and content amongst the various users and groups of social network program 122. Messages may include text content such as plain text or rich text. Messages may also include media rich content such as audio, pictures, or video. Messages may also include links to other websites and content, profiles of users, or groups of the social network. Messages may also include information regarding actions performed within the social network program by users as well, e.g. a user updating a profile, joining a group, or liking or recommending a message already posted to social network program 122. When a user creates and posts a message, social network program 122 stores the message as message data 127.

Message data 127 stores an entry for each message created by users of social network program 122. Each message stored in message data 127 is associated to the user that creates the message. Messages data 127 also stores the intended recipients of a message. The intended recipients may be a specific user, a group of users, a friend or contact of the user, a group of friends or contacts of the user, a group stored in group data 126, or specific members of a group stored in group data 126. Message data 127 also stores the time and date a message was posted to social network program 122. Message data 127 also stores an indication that a message is public or private. A public message is viewable by any user of social network program 122, given the profile the message is sent to is not a private profile. A private message is viewable to only the recipient(s) selected by the user as well as the user posting the message. In some embodiments, a public message is viewable by users without a profile stored in user data 125, e.g. users who are not a member of the social network. Messages may also be made publicly viewable by posting the message directly to the profile of the user who created the message.

In one embodiment, message data 127 also stores information indicating which users, if any, have viewed a particular message. Message data 127 stores information indicating a user viewed a particular message as well as the time and date the viewing occurred. Message data 127 also stores any other actions a user can make indicative of a user's approval of a message, e.g. liking or recommending the message. When a user views or approves of a particular message, social network program 122 updates an entry in message data 127 corresponding to the viewed or approved message with the user who viewed or approved of the message along with the time and date the event occurred.

Message data 127 stores information indicative of threaded conversations. Threaded conversations are more than one message between users of social network program 122, where a user creates a message (or "parent") and other users of social network program 122 can post subsequent (or "child") messages that respond to the parent message. Message data 127 stores each message as separate entries and store a link that points to other messages stored in message data 127 when replied to. Message data 127 stores links in the parent message to any child messages that are a reply to the parent message. Message data 127 stores links in child messages to any parent messages they are in response to. Child messages may also be responded to and become a parent message to any response made by other users of social network program 122. The links stored in messages data 127 for parent and child messages create a data structure that represents a threaded conversation. As such feedback program 124 is capable of following a series of messages in a threaded conversation by the links stored in message data 127.

In one embodiment, message data 127 is presented to users as an activity stream. In response to viewing a user's profile, an activity stream is displayed for the user. The activity stream includes messages addressed to, or sent by, the user whose profile is being viewed. In response to viewing a user's profile, message data 127 is compared to the user's profile and messages that are created by the user are displayed. In other embodiments, message data 127 is compared to the user's profile and messages that the user is a recipient of a message are displayed. The activity stream is able to be sorted or filtered by the user associated with the profile or by other users of social network program 122 who are viewing the particular user's profile. Messages may be sorted by the time in which they were created, creating a timeline of activity reflecting a user's messages made on social network program 122. Messages may be filtered based on information contained in a user's profile, e.g. messages created from members of a group the user is a member of.

In one embodiment, feedback program 124 determines a popularity score for a new message as it is being created, prior to the message being posted by social network program 122. When user program 112 of user device 110 receives input from a user to create a message, prior to the message being posted to social network program 122, user program 112 sends the message to feedback program 124. Feedback program 124 receives the message and determines a popularity score of the message. The popularity score represents the likelihood that an individual recipient or group of recipients will view the message being created when posted. Once the popularity score is determined, feedback program 124 generates a visual indicator representative of the popularity score and sends the visual indicator to user program 112. User program 112 displays to the user the visual indicator prior to the user posting the message to social network program 122. If the user alters the message, feedback program 124 determines a new popularity score based on the current message received from user program 112 as it is being created by the user. In other embodiments, feedback program 124 sends the popularity score once determined. In this case, user program 112 generates the visual indicator for display to user device 110.

In one embodiment, feedback program 124 determines the popularity score by comparing the message stored in user program 112 as it is being created by the user against one or more of the following: user data 125, group data 126, message data 127, and prediction data 128. The popularity score is a measure of the degree to which a message being created will be viewed other users of social network program 124. The popularity score is determined by the statistical confidence that the one or more recipients of a message will view the message when posted. Given that multiple recipients are intended to be sent the message, the popularity score is determined for each recipient of the message and the resulting statistical confidence determined for each recipient is combined to create a total popularity score for all the recipients of the message being created.

Prediction data 128 includes statistical models which includes rules and weights. Feedback program 124 applies weight to the rules to determine the popularity score of a new message created by the user of user program 112. Statistical models of prediction data 128 include rules used to determine a likelihood one or more recipients of the message being created will view the message once it is posted to social network program 122. Statistical models also contain weights associated with the rules stored in prediction data 128. The weights indicate the importance of the rule when feedback program 124 uses when determining a popularity score for a message. Feedback program 124 generates a popularity score by applying the statistical models contained in prediction data 128 to the content of the new message. The statistical models include one or more of the following: linear regression models, decision trees, or cluster analysis.

In one embodiment, user data 125 and group data 126 include popular content data respectively. For each user associated with an entry in user data 125, popular content data is stored. Popular content data for a user includes content that feedback program 124 has determined to be popular from analyzing a user's profile and analyzing message content viewed by the user stored in message data 127. For each group associated with an entry in group data 126, popular content data is stored. Popular content data for a user includes content that feedback program 124 has determined to be popular from analyzing a group's profile and analyzing message content viewed by the users of the group stored in message data 127. Popular content data associates a weight indicating the likelihood that a user or group of users will read a message for each item of popular content stored for the user of group of users. Feedback program 124, in some embodiments, determines the popularity score based on the weight associated with particular content data. Feedback program 124 updates popular content data of user data 125 and group data 126 based on message data 127 viewed by the user or group of users, based on the content of message data 127 the user or group of users viewed, respectively. Feedback program 124 assigns a weight to popular content data based on the frequency that a user or group of users viewed similar content.

Popular content data stored in user data 125 and group data 126 includes keywords, phrases, ideas, or other content popular amongst specific users and groups of users of social network program 122, respectively. Keywords include certain text that a user or group of users find popular. Phrases include sequences of words or groupings of text that a user or group of users find popular. Ideas include concepts, as determined by natural language processing, to be popular among a user or group of users, such that the text of a new message is not the same as popular content data however the content is determined to contain similar concepts by feedback program 124. Other content includes content other than text, such as video content, audio content or other media rich content.

Feedback program 124 correlates popular content data with one or more recipients of a new message created by a user. In response to the new message having a low popularity score, feedback program 124 generates a suggestion. As an example, the popular content data of an entry for a recipient stored in user data 125 indicates that the particular user is likely to view posts that include video content. As such, feedback program 124 suggests adding video content to the message in order to increase the popularity score associated with the recipient.

In one embodiment, feedback program 124 receives a message from user program 112 as a user of user device 110 is creating a message. Feedback program 124 applies natural language processing to the message being created in order to determine the content of the message. Feedback program 124 determines the popularity score of the message based on the content as determined by the natural language processing. Feedback program 124 applies statistical models stored in prediction data 128 to the determined message content to determine a popularity score. Feedback program 124 will also gather any relevant user data 125 and group data 126, based upon the recipients of the message being created, when applying the statistical models of prediction data 128.

In one embodiment, feedback program 124 applies message data 127 to the statistical models of predication data 128. For example, given the message being created is a reply to a previous message and as such part of a threaded conversation, feedback program 124 applies message data 127 of any parent message in the threaded conversation as well as any other child messages in the threaded conversation to the statistical models of prediction data 128. Feedback program 124 determines the content of each message of the threaded conversation using natural language processing. The statistical models of prediction data 128 determines if content of the message being created by a user is similar to content of the messages in the threaded conversation. Based on the similarity, feedback program 124 generates a higher popularity score.

In one embodiment, feedback program 124 also applies threaded conversation message data 127 to determine the timeliness of the messages in a threaded conversation to the statistical models of predication data 128. The timeliness of a message in a threaded conversation may be determined by feedback program 124 based on a predetermined amount of time before the current time, e.g. timely message content includes messages posted within the last two hours. The timeliness of a message in a threaded conversation may also be determined by feedback program 124 based upon a predetermined number of parent messages in a threaded conversation, e.g. timely message content includes content for the previous two parent messages. For example, in a threaded conversation the topics discussed will change over time. In this case a new message to the threaded conversation will need to be on topic to be considered popular in the threaded conversation. Feedback program 124 applies a weight to messages of the threaded conversation which gives less importance to content of older messages in the threaded conversation and more importance to more recent messages of the conversation. Therefore if a user creates a message with content earlier in the threaded conversation, then the message will not receive a high popularity score. However, if the user creates a message with similar content to messages towards the end of the threaded conversation, then the message will receive a higher popularity score.

In one embodiment, feedback program 124 gathers all relevant information to the message stored in one or more of the following: user data 125, group data 126, and message data 127. Feedback program 124 applies the gathered information to the statistical models of prediction data 128 and generates a popularity score. Feedback program 124 generates a visual indicator that is indicative of the popularity score for the current message being created by the user. Feedback program 124 sends the visual indicator to user program 112 for display on user device 110. The visual indicator may include one or more of the following: a symbol, a color coded icon, a percentage value, a gradient, a message, and a progress bar. As an example, a color coded icon has the color red if the popularity score is below a threshold value and green when the popularity score is above the threshold. As another example, a progress bar may be filled based on the number of recipients in a group with popularity scores indicative of the recipients likely to view the message.

In other embodiments, feedback program 124 determines the popularity score is below a threshold. In response to determining the popularity score is below a threshold determination, feedback program 124 sends to user program 112 suggestions to alter the message being created such that the suggested change will increase the popularity score. The suggestions may be determined on popular content data and profile data stored in user data 125 and group data 126. Feedback program 124 may also suggest content contained in a threaded conversation stored in message data 127 given the message is part of a threaded conversation. Feedback program may also suggest changes based on determinations made by the statistical models of prediction data 128.

In one embodiment, the user alters the message being created in user program 112. User program 112 sends the updated message to feedback program 124. Feedback program 124 determines a new popularity score as well as any suggestions given the popularity score is below a certain value. Feedback program 124 generates a visual indicator representative of the popularity score and sends the visual indicator to user program 112 of user device 110 for displaying to the user. Feedback program 124 also sends any generated suggestions to user program 112 of user device 110 for displaying to the user. The user may continue the process of changing the message being created. As such, feedback program 124 determines a new popularity score and generates suggestions and a visual indicator, until the user posts the message to social network program 122.

In other embodiments, feedback program 124 generates visual indicator of the popularity score and any determined suggestions on a user by user basis for each of the intended recipients. Feedback program 124 determines the popularity score for each recipient and, given the popularity score is below a certain value for the recipient, suggestions for each recipient. Feedback program 124 generates a visual indicator and sends the visual indicator to user program 112 for displaying on user device 110 to the user. User program 112 displays a visual indicator alongside the respective recipient the popularity score is applicable to, as well as any suggestions generated by feedback program when the popularity score for the particular recipient is below a certain value for the particular recipient.

In one embodiment, social network program 122 determines a message has been viewed by information received from user program 112. In response to determining that a message is viewed, social network program 122 updates the entry of message data 127 corresponding to the message with information indicating the user who viewed the message and the time and date the viewing occurred. In other embodiments, user program 112 determines the current information being displayed to the user of user device 110. In response to determining that particular message data 127 was requested and displayed by user program 112, user program 112 sends a notification to social network program 122 of the viewing of message data 127. Social network program 122, in response to receiving the notification of the viewing of message data 127, updates the entry of message data 127 corresponding to the message that was viewed with information indicating the user who viewed the message and the time and date the viewing occurred. In some embodiments, user program 112 requests multiple entries in message data 127 to be displayed to a user, e.g. an activity stream for a user. In the instant case, user program sends a notification of message data 127 being viewed based on which particular portion of the requested message data 127 was displayed on the display of user device 110.

In other embodiments, user device 110 is communicatively coupled to a camera, where the camera provides visual information of a user. User program 112 receives the visual information of the user and makes a determination of the user eye movements from the received visual information. User program 112 correlates the visual information with the location of message data 127 currently displayed on user device 110. In response to the correlation of eye movements and the location of message data 127 as it is currently displayed of user device 110, user program 112 determines which messages being displayed on the display of user device 110 are being viewed by the user. User program 112, as a result of the determined correlation, sends notifications to social network program 122 indicating that the user has viewed a particular message of the displayed message data 127.

In other embodiments, user program 112 receives from a user a request to like or recommend a message in message data 127. In response to receiving the request to like or recommend a message, user program 112 sends the request to social network program 122. Social network program 122 processes the request received from user program 112 in addition to update the corresponding message of message data 127 the request is indicating to have been viewed by the user. In other embodiments, social network program 122 tracks a user's interaction with social network program 122 by way of user program 112. Social network program 122 determines a message is viewed based on received requests from user program 112. Given that the request contains a message stored in message data 127, social network program 122 determines the message has been viewed by the user and updates the entry in messages data 127 for the determined message to indicate which user has viewed the message and the date and time the viewing occurred.

In one embodiment, prediction data 128 is trained based on expected outcomes generated by feedback program 124. As an example, feedback program 124 determines a message will be popular with seven out of ten recipients. However at a later time, social network program 122 has updated message data 127 to indicate that only four out of the ten recipients viewed the message. In response, feedback program 124 reduces the weight of the rules that indicated the three recipients who did not view the message were predicted to be popular. In other embodiments, prediction data 128 is trained in response to a degree of satisfaction sent by user program 112 by a user. After a user has posted a message, the user gives an evaluation of the popularity score generated by feedback program. User program 112 receives the evaluation from the user and sends the evaluation to feedback program 124. Based on the content of the evaluation, feedback program 124 trains the prediction data 128 accordingly, e.g. if a negative evaluation is given the weights associated to the rules that generated the score are reduced.

Figure 2:
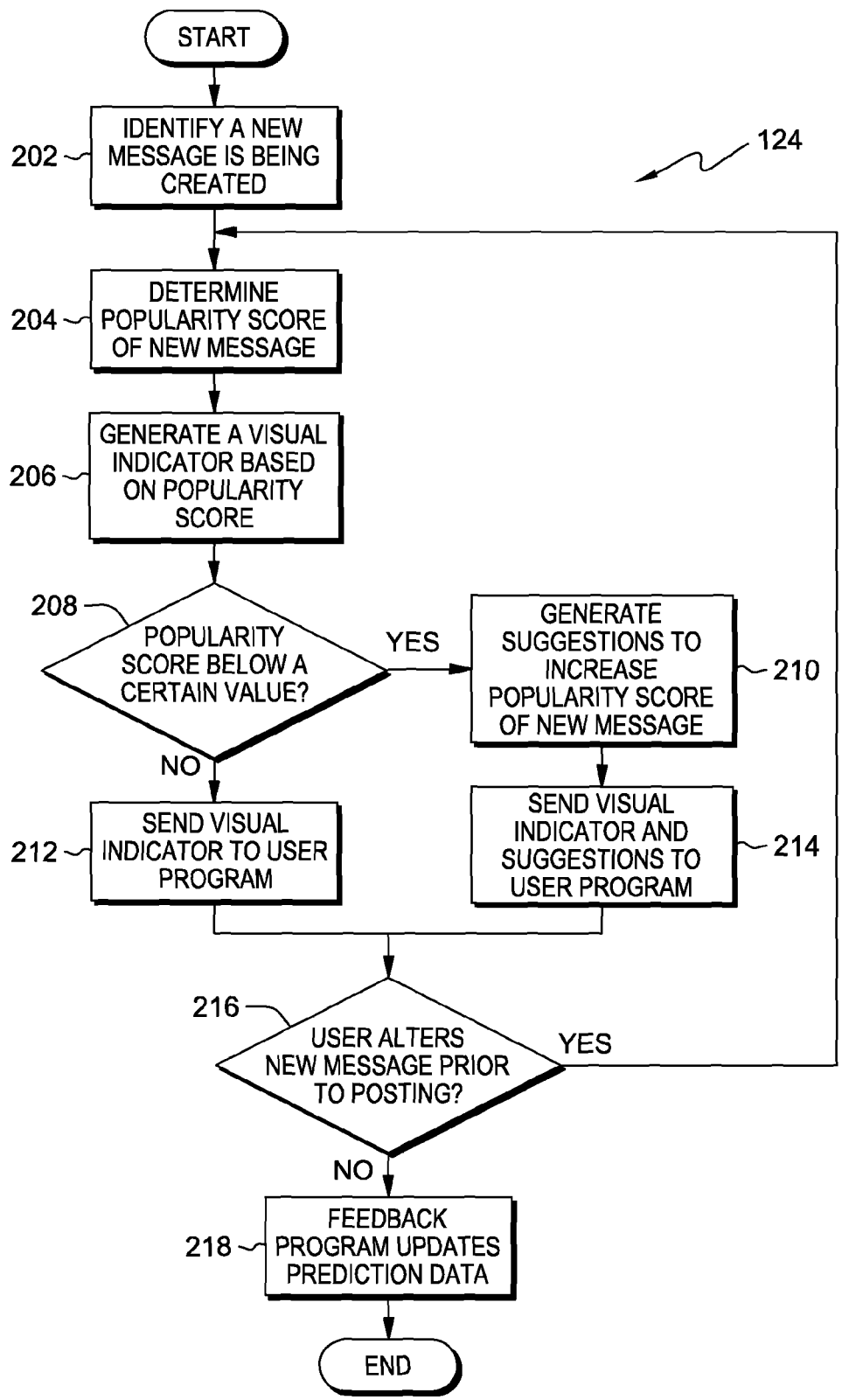
FIG. 2 illustrates operational process of a feedback program, on a social network server within the networked environment of FIG. 1, in accordance with an embodiment of the present invention.

FIG. 2, is a flowchart, 124, illustrating the operational process of feedback program 124 executing on social network server 120, in accordance with an embodiment.

In process 202, feedback program 124 of social network server 120 identifies that a new message is being created by a user. In response to receiving a request from a user of user device 110 to create a new message, user program 112 sends the new message as the message is being created to feedback program 124. Feedback program 124 proceeds to process 204 once a message being created is received. In process 204, feedback program 124 determines a popularity score for the new message sent by user program 112 in response to user program receiving input from a user creating a new message. Feedback program 124 performs natural language processing to the message being created to determine the content of the message being created. Feedback program 124 applies statistical models to the content of the message being created to create a popularity score using one or more of user data 125, group data 126, message data 127, or prediction data 128. In some embodiments, for messages with multiple recipients the popularity score is determined for each recipient as well as the popularity score among all the recipients of the new message being created. Once a popularity score is determined for the recipients of the new message being created, feedback program 124 proceeds to process 206.

In process 206, feedback program 124 generates a visual indicator based on the popularity score determined in process 204. In some embodiments, feedback program 124 generates a visual indicator for each recipient of the new message being created. The visual indicator is discussed in more detail in FIGS. 3 and 4 below. Once the visual indicator is generated, feedback program 124 proceeds to decision process 208.

In decision process 208, feedback program 124 determines if the popularity score generated in process 204 is below a certain value. If the popularity score is below a certain value, indicating the new message being created will be unpopular to the recipients, then feedback program 124 proceeds to process 210 (decision process 208, YES branch). If the popularity score is not below a certain value, indicating the new message being created will be popular among the recipients, then feedback program 124 proceeds to process 212 (decision process 208, NO branch).

In process 212, feedback program 124 sends the generated visual indicator determined in process 206 to user program 112 for displaying on user device 110 to the user. Embodiments of displaying the visual indicator are discussed below in FIGS. 3 and 4. Once the generated visual indicator is sent to user program 112, feedback program proceeds to decision process 216.

In process 210, feedback program 124 generates suggestions to increase the popularity score of the new message being created. The suggestions include content to add to the new message, such as text and other media such as pictures, audio or video, such that the additional content will increase the popularity score among the recipients of the new message being created. Once the suggestions have been generated, feedback program 124 proceeds to process 214.

In process 214, feedback program 124 sends the generated visual indicator determined in process 206 and suggestion to increase the popularity score determined in step 210 to user program 112 for displaying on user device 110 to the user. Embodiments of displaying the visual indicator and suggestions are discussed below in FIGS. 3 and 4. Once the generated visual indicator and suggestions are sent to user program 112, feedback program proceeds to decision process 216.

In decision process 216, feedback program 124 monitors any alterations made to the new message as received from user program 112. If a user makes an alteration to the new message being created, then feedback program 124 proceeds back to process 204 and determines a new popularity score based on the content of the altered new message (decision process 216, YES branch). Feedback program 124 monitors new message information received from user program 112 and generate a popularity score, visual indicator and suggestions. If the user does not alter the new message being created and selects to post the message to social network program 122, then feedback program 124 proceeds to process 218 (decision process 216, NO branch). In process 218, compares the determined popularity score with message data 127 after the message is posted. In response to determining a significant statistical difference between the determined popularity score and the recipients who viewed the messaged posted to social network program 122 by the user, feedback program 124 updates prediction data 128 accordingly. For example, if the popularity score indicates fewer recipients than those who viewed the message as it was posted to social network program 122, the feedback program 124 decreases the weight assigned to the rules that made associated with the determined popularity score.

Figure 3:
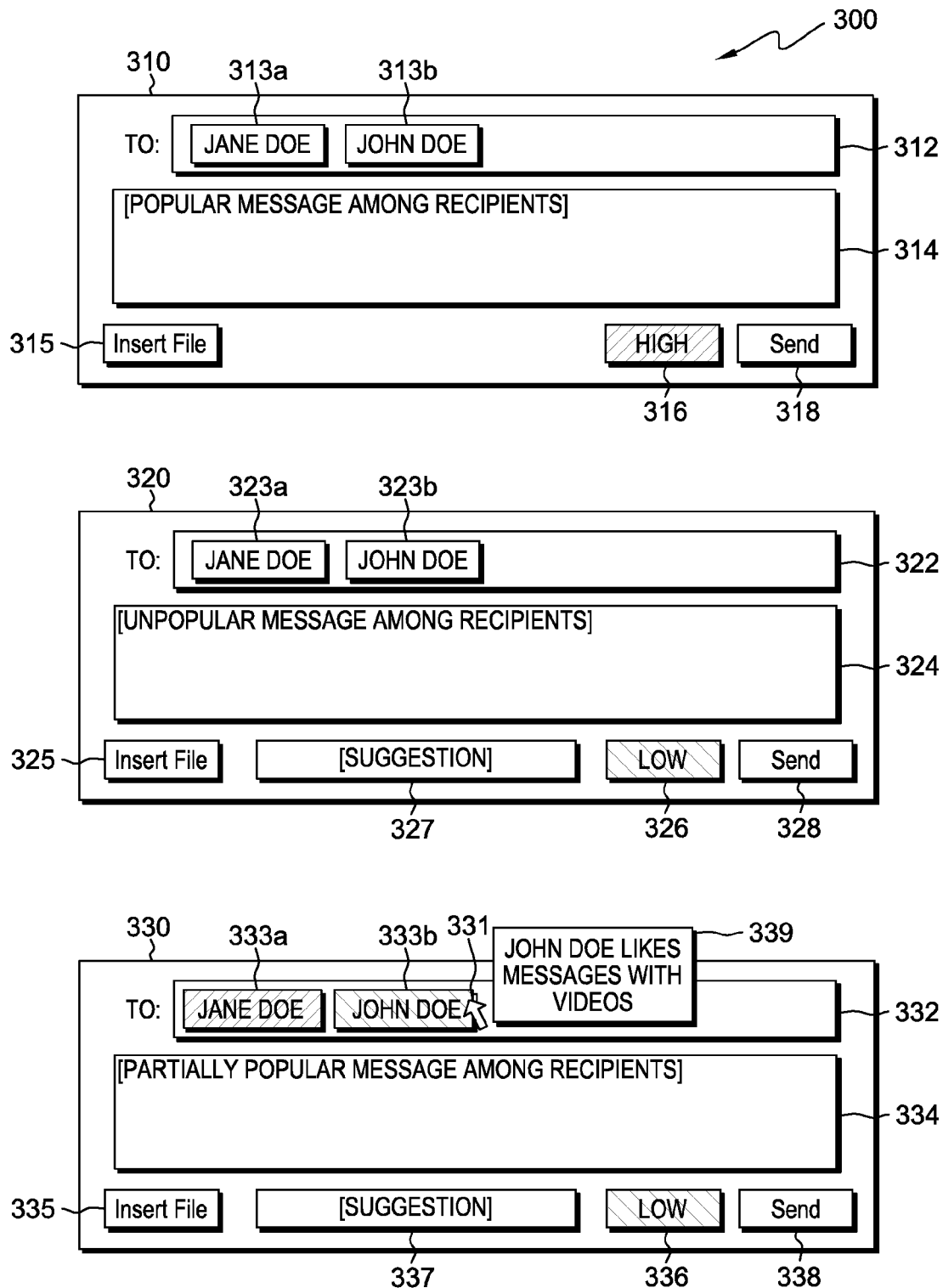
FIG. 3 illustrates user interfaces of a user program displaying visual indicators and suggestions generated by a feedback program, in accordance with an embodiment of the present invention.

FIG. 3 depicts graphical user interfaces, 300, of user program 112, in accordance with an illustrative embodiment of the present invention. It should be appreciated that FIG. 3 provides only an illustration of different implementations and does not imply any limitations with regard to the environments in which different embodiments may be implemented. Many modifications to the depicted interfaces may be made.

User interfaces 310, 320 and 330 are illustrative examples of how information is collected and presented to a user of user device 110. User interface element 310 illustrates an implementation of the invention where a user is creating a message that has been determined to have a popularity score above a certain value. User interface element 320 illustrates an implementation of the invention where a user is creating a message that has been determined to have a popularity score below a certain value. User interface element 330 illustrates an implementation where the popularity score and visual indicator are displayed for each recipient.

Each user interface 310, 320 and 330 includes a recipient element 312, 322, and 332 respectively. Recipient elements 312, 322 and 332 contain one or more intended recipient elements 313a and 313b, 323a and 323b, and 333a and 333b. Recipient elements 312, 322 and 332 provide an interface within user program 112 for a user to add and remove recipients of a message. Intended recipient element 313a and 313b, 323a and 323b, and 333a and 333b are the recipients currently being addressed in the new message being created. Intended recipient elements may be added and removed to the recipient element and are sent to feedback program 124 by user program 112 for determination of the popularity score based on which particular users, who are stored in user data 125, the message is intended to be sent to.

Each user interface 310, 320 and 330 includes new message elements 314, 324, and 334 respectively. New message elements 314, 324, and 334 are interface of user program 112 for a user to create a new message. As the new message is being created, the information contained within new message elements 314, 324 and 334 is sent to feedback program 124 by user program 112 for determination of the popularity score in response to the content of the message being created.

Each user interface 310, 320 and 330 includes insert file elements 315, 325, and 335 respectively. Insert file elements 315, 325 and 335 are interfaces of user program 112 which users embed media rich content, e.g. video or audio clips, or links to other content into the message, e.g. links to profiles stored in user data 125 that are part of social network program 122 or links to content located on servers outside the social network server 120 such as hypertext links to other web pages. Feedback program 124 is sent the updated message content by user program 112 for determination of the popularity score in response to the content of the message being created.

Each user interface 310, 320 and 330 includes overall popularity elements 316, 326, and 336 respectively. Overall popularity elements 316, 326, and 336 represent a visual indicator representative of the determined popularity score by feedback program 124. Based in part on the information currently represented by intended recipient elements 313*a* and 313*b*, 323*a* and 323*b*, and 333*a* and 333*b* and the information currently contained in new message elements 314, 324, and 334, feedback program 124 determines a popularity score and generates the overall popularity elements 316, 326, and 336. Feedback program 124 sends to user program 112 a visual indicator representative of the determined popularity score. User program 112 displays the visual indicator of the popularity score as overall popularity elements 316, 326 and 336.

In these illustrative examples of user interfaces 310, 320 and 330, overall popularity elements 316, 326, and 336 are color-coded icons with descriptive text contained within. For user interface element 310, new message element 314 contains content determined by feedback program 124 to have a popularity score above a certain value for the intended recipients of the message as represented by intended recipient elements 313*a* and 313*b*. Feedback program 124 generates a visual indicator representative of the determination of the popularity score and sends the visual indicator to user program 112 which displays the visual indicator as overall popularity element 316. Since the popularity score is above a certain value, overall popularity element 316 is color coded as red to indicate that the message is popular, as well as the textual message of 'HIGH' being displayed alongside the color coded icon to further convey to the user the message will be popular. Conversely, user interface 320 currently contains information in new message element 324 that has been determined have a popularity score below a certain value and will therefore be unpopular. User program 112 receives a visual indicator from feedback program 124 representative of this determination and displays the visual indicator as overall popularity element 326. In this particular case, overall popularity indicator 326 is color coded blue to in response to the popularity score determined to be below a certain value, as well as the textual message of TOW' being displayed alongside the color coded icon to further convey to the user the message will be unpopular.

User interfaces 320 and 330 includes overall suggestion elements 327 and 337 respectively. Suggestion elements 327 and 337 are displayed within user program 112 when feedback program 124 has determined the popularity score of message information contained in new message elements 324 and 334, respectively, to be below a certain value. As such feedback program 124, along with generating visual indicators indicative of the low popularity score, also provides suggestions to user program 112 that will increase the popularity score of the message when it is posted to all the respective intended recipients, given the suggestions are included in the respective new message element. User program 112 displays the suggestions in overall suggestion elements 324 and 334, respectively. In some embodiments, such as user interface 310, an overall suggestion element is not presented in user program 112 given that the popularity score, as determined by feedback program 124, is above a certain value.

Each user interface 310, 320 and 330 includes send elements 318, 328, and 338 respectively. Send elements 318, 328 and 338 initiates a posting of the message as stored in new message element 314, 324 and 334 respectively to social network program 122. Social network program 112 sends the message to the intended recipients as currently stored in recipient elements 312, 322 and 332 respectively.

In the illustrative example of user interface 330, intended recipient elements 333*a* and 333*b* also change appearance or have visual indicators based on the determined popularity score of the respective intended recipient. In this particular example, feedback program 124 determines the intended recipient of element 333*a* has an individual popularity score above a certain value based, in part, to the current information of new message element 334. In this case the element is highlighted green to illustrate the particular user will likely view the message once posted. Feedback program 124 also determines intended recipient, as shown in element 333*b*, not likely finding the message popular and likely not view the message once posted. In this case intended recipient element 333*b* is highlighted red in response to the popularity score determined to be below a certain value.

User interface 330 also include personal suggestion element 339. In response to a particular recipient being determined to have a popularity score below a certain value by feedback program 124 provides suggestions for the particular intended recipient with a relatively low popularity score. In a GUI environment, element 331 of user interface 330 is a pointer mouse input of provided by user device 110. Given that a user has placed the mouse of intended recipient element 333*b*, a rollover text box appears as personal suggestion element 339. Personal suggestion element 339 provides suggestions to increase the popularity score associated with the recipient of intended recipient element 333*b*. In environments where touch is used to select GUI elements, such as a tablet, a tap or hold gesture initiates the display of personal suggestion element 339.

Figure 4:
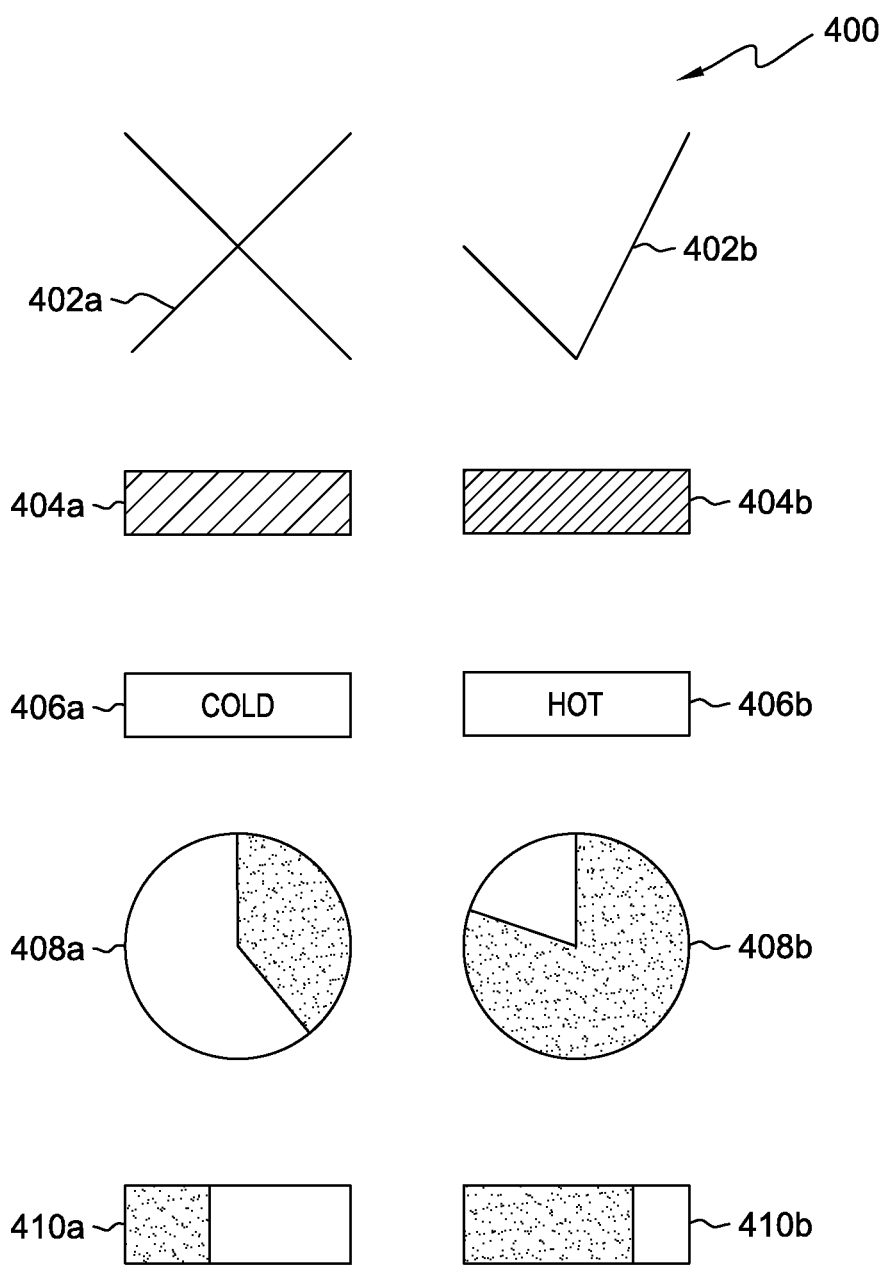
FIG. 4 illustrates visual indicators generated by a feedback program, in accordance with an embodiment of the present invention.

FIG. 4 depicts visual indicators, 400, generated by feedback program 124, in accordance with an illustrative embodiment of the present invention. It should be appreciated that FIG. 4 provides only an illustration of different implementations and does not imply any limitations with regard to the environments in which different embodiments may be implemented. Many modifications to the depicted visual indicators may be made.

Visual indicators as generated by feedback program 124 and displayed by user program 112 are presented. Some embodiments of visual indicators may be symbols, such as cross mark 402*a* or checkmark 402*b*. Other embodiments of visual indicators may be color coded icons, such as a red colored bar 404*a* and a green colored bar 404*b*. In other embodiments the visual indicators may be text such as the words "COLD" 406*a* of "HOT" 406*b*. The above embodiments of the visual indicators are representative of the popularity score as determined by feedback program 124 to be either below or above a certain value. In other embodiments, feedback program 124 may apply a visual style to the visual indicator, such as a colored highlight or italicizing, to the text message or the name of an intended recipient.

Figure 5:
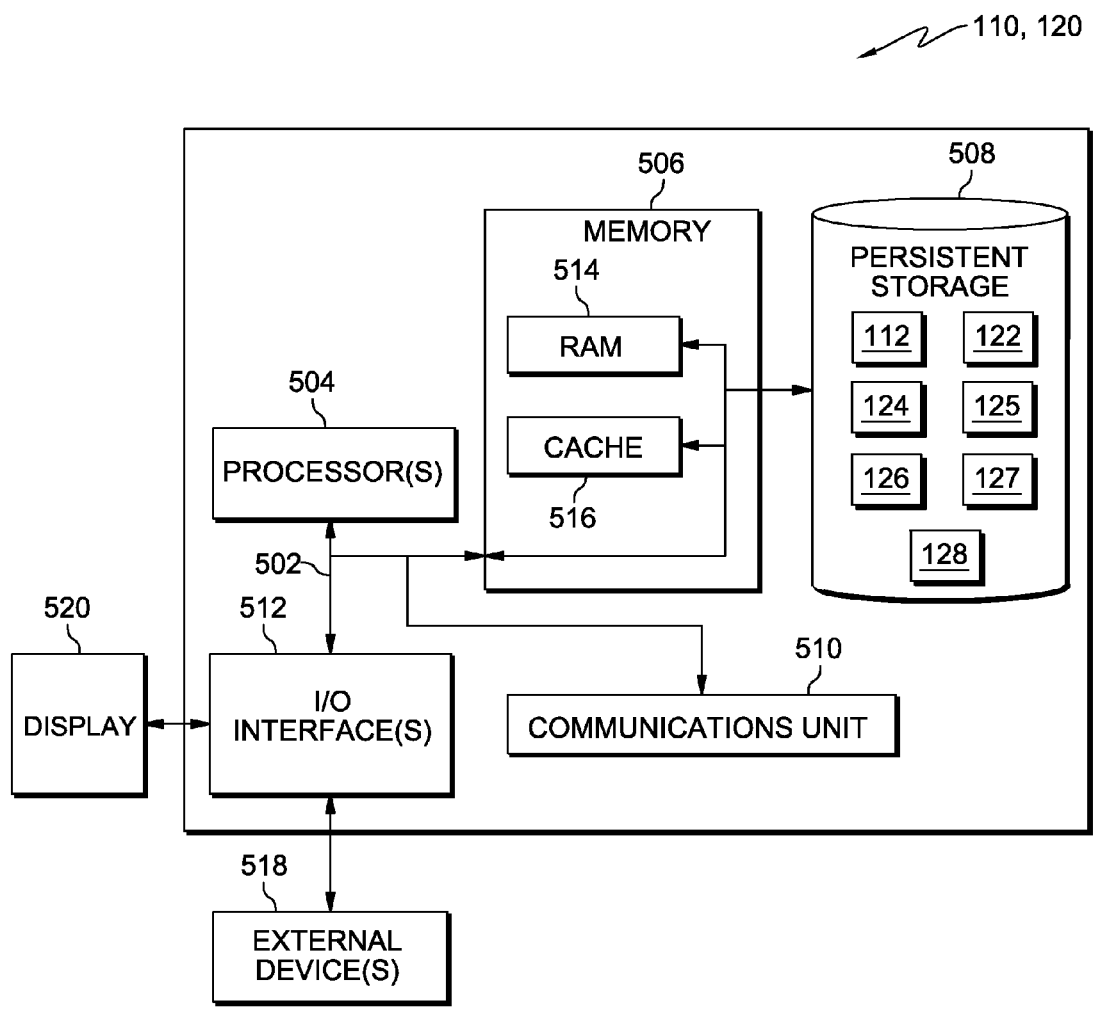
FIG. 5 depicts a block diagram of components of the computing device executing a user program, a social network program and a feedback program, in accordance with an embodiment of the present invention.

In embodiments where multiple intended recipients are part of the generation of the visual by feedback program 124, visual indicators 408a, 408b, 410a and 410b may be used. In response to the number of intended recipients whose individual popularity score is below a certain value and the number of intended recipients whose popularity score is above a certain value, a visual indicator is generated illustrating the portion of intended recipients who will find the post popular and view the message, i.e. the colored in portion of 408a, versus the portion of intended recipients who will not find the post popular and not view the message, i.e. the uncolored portion of 408a. Visual indicators 408a and 408b illustrates a pie chart representation of the number of recipients you will likely view the message once posted. Visual indicators 410a and 410b illustrates a progress bar representation FIG. 5 depicts a block diagram of respective components of user device 110 and social network server 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110 and social network server 120 respectively include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User program 112, social network program 122, and feedback program 124 are respectively stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. User program 112, social network program 122, and feedback program 124 may respectively be downloaded to persistent storage 508 through communications unit 510.

I/O interface(s) 512 allows for input and output of data with other devices that may be connected to user device 110 and social network server 120 respectively. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user program 112, social network program 122, and feedback program 124, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

In another embodiment, the invention provides a method that performs the process of the invention on a subscription, advertising, and/or fee basis. That is, a service provider, such as a Solution Integrator, could offer to provide feedback functionality in a social network. In this case, the service provider can create, maintain, support, etc., a computer infrastructure, such as social network server 120 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing feedback in a social network. In this case, a computer infrastructure, such as social network server 120 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as social network server 120 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Java", "Smalltalk" and the like may be subject to trademark rights in various jurisdictions throughout the world and are used here only in reference to the products or services properly denominated by the marks to the extent that such trademark rights may exist.

What is claimed is:

1. A method for providing feedback enhancement in a social network, comprising:
   receiving, by one or more processors, a new message prior to the new message being posted by a user to the social network;
   determining, by the one or more processors, a popularity score of the new message based, at least in part, on a likelihood the new message will be viewed by one or more recipients of the new message, wherein the popularity score corresponds to a prediction that the one or more recipients will view the new message; and
   generating, by the one or more processors, a visual indicator based, at least in part, on the popularity score prior to the user posting the new message to the social network for viewing by the one or more recipients.

2. The method of claim 1, wherein the popularity score is determined automatically in response to receiving a change to the new message prior to the user submitting the new message to the social network.

3. The method of claim 1, wherein the popularity score is based, at least in part, on the new message including content of recent messages in a threaded conversation.

4. The method of claim 1, further comprising generating at least one suggestion in response to determining that the popularity score is below a pre-determined threshold value.

5. The method of claim 4, wherein generating the at least one suggestion comprises generating at least a first suggestion for a first recipient of the new message and second suggestion for a second recipient of the new message.

6. The method of claim 1, wherein generating the visual indicator comprises generating at least a first visual indicator for a first recipient of the new message and second visual indicator for a second recipient of the new message.

7. The method of claim 1, wherein the visual indicator comprises at least one or more of the following: a symbol, a color coded icon, a message, a pie chart, a visual style, or a progress bar.

8. A computer program product for providing feedback enhancement in a social network, the computer program product comprising one or more computer readable storage mediums having program instructions embodied therewith, the program instructions executable by one or more processors to cause the one or more processors to perform a method comprising:
   receiving a new message prior to the new message being posted by a user to the social network;
   determining a popularity score of the new message based, at least in part, on a likelihood the new message will be viewed by one or more recipients of the new message, wherein the popularity score corresponds to a prediction that the one or more recipients will view the new message; and
   generating a visual indicator based, at least in part, on the popularity score prior to the user posting the new message to the social network for viewing by the one or more recipients.

9. The computer program product of claim 8, wherein the popularity score is determined automatically in response to receiving a change to the new message prior to the user submitting the new message to the social network.

10. The computer program product of claim 8, wherein the popularity score is based, at least in part, on the new message including content of recent messages in a threaded conversation.

11. The computer program product of claim 8, the method further comprising generating at least one suggestion in response to determining that the popularity score is below a pre-determined threshold value.

12. The computer program product of claim 11, wherein generating the at least one suggestion comprises generating at least a first suggestion for a first recipient of the new message and second suggestion for a second recipient of the new message.

13. The computer program product of claim 8, wherein generating the visual indicator comprises generating at least a first visual indicator for a first recipient of the new message and second visual indicator for a second recipient of the new message.

14. The computer program product of claim 8, wherein the visual indicator comprises at least one or more of the following: a symbol, a color coded icon, a message, a pie chart, a visual style, or a progress bar.

15. A system for providing feedback enhancement in a social network comprising:
   one or more computer-readable mediums; and
   one or more processors in communication with the one or more computer readable storage mediums, wherein the system is configured to perform a method, said method comprising:
      receiving a new message prior to the new message being posted by a user to the social network;
      determining a popularity score of the new message based, at least in part, on a likelihood the new message will be viewed by one or more recipients of the new message, wherein the popularity score corresponds to a prediction that the one or more recipients will view the new message; and
      generating a visual indicator based, at least in part, on the popularity score prior to the user posting the new message to the social network for viewing by the one or more recipients.

16. The system of claim 15, wherein the popularity score is determined automatically in response to receiving a change to the new message prior to the user submitting the new message to the social network.

17. The system of claim 15, wherein the popularity score is based, at least in part, on the new message including content of recent messages in a threaded conversation.

18. The system of claim 15, the method further comprising generating at least one suggestion in response to determining that the popularity score is below a pre-determined threshold value.

19. The system of claim 18, wherein generating the at least one suggestion comprises generating at least a first suggestion for a first recipient of the new message and second suggestion for a second recipient of the new message.

20. The system of claim 15, wherein generating the visual indicator comprises generating at least a first visual indicator for a first recipient of the new message and second visual indicator for a second recipient of the new message.

* * * * *